March 17, 1953 F. F. OPPENLANDER ET AL 2,631,842
WHEEL SUSPENSION
Filed Nov. 20, 1950
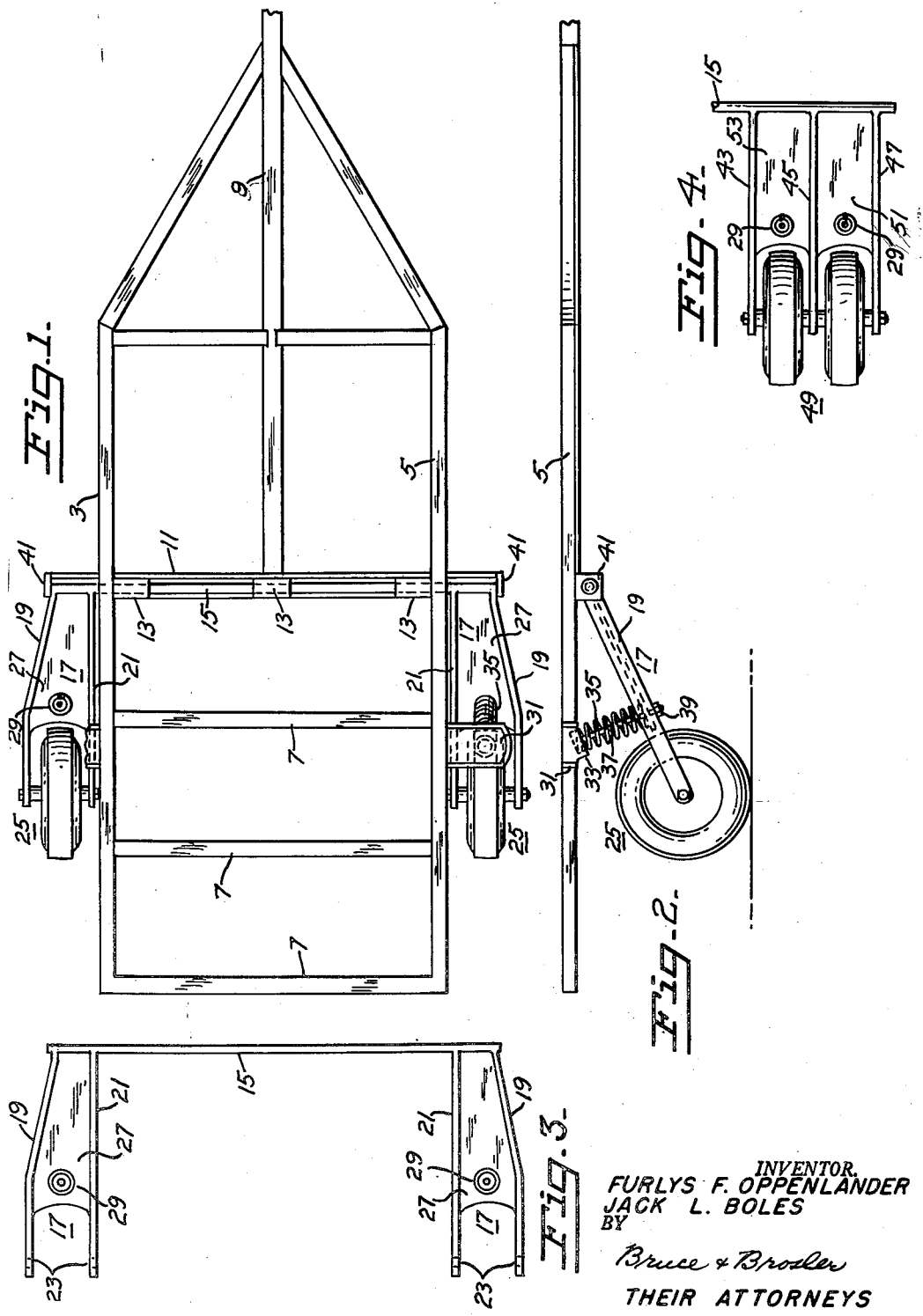
INVENTOR.
FURLYS F. OPPENLANDER
JACK L. BOLES
BY
Bruce & Brosler
THEIR ATTORNEYS Patented Mar. 17, 1953

2,631,842

UNITED STATES PATENT OFFICE 2,631,842

WHEEL SUSPENSION

Furlys F. Oppenlander, Berkeley, and Jack L. Boles, Sacramento, Calif., assignors of one-third to said Boles and two-thirds to Edgar D. Easton, Rio Vista, Calif.

Application November 20, 1950, Serial No. 196,570

3 Claims. (Cl. 267—11)

Our invention relates to trailers and the like, and more particularly to a wheel suspension for the same.

Among the objects of our invention are:

(1) To provide a novel and improved wheel suspension for a trailer or the like;

(2) To provide a novel and improved wheel suspension which permits of soft spring action;

(3) To provide a novel and improved wheel suspension which prevents sideplay on the part of the wheels;

(4) To provide a novel and improved wheel suspension which eliminates the need for conventional type spindles for mounting the wheels;

(5) To provide a novel and improved wheel suspension which results in a minimum amount of unsprung weight;

(6) To provide a novel and improved wheel suspension of simple yet rugged construction and one which may be manufactured economically.

Additional objects of our invention will be brought out in the following description of a preferred embodiment of the same, taken in conjunction with the accompanying drawings wherein—

Figure 1 is a plan view of a trailer assembly embodying the present invention;

Figure 2 is a side elevational view thereof;

Figure 3 is a plan view of a wheel bracket and axle assembly forming part of the present invention;

Figure 4 is a view depicting a modification of the invention of Figure 1 to provide for dual wheel mounting.

The wheel suspension is designed for application to the frame of the trailer, which frame may comprise a pair of side rails 3 and 5 joined at intervals by cross-members 7, the side rails being bent to converge for connection to a draw-bar 9 to which they are welded. At an intermediate location on the frame, a cross-rail 11 of angle iron is suspended slightly below the plane of the frame, such cross-rail being of sufficient length to extend somewhat beyond each of the side rails of the frame. At the midpoint of such cross-rail and in the vicinity of the side rails, bearing blocks 13 are fitted into the angle of the cross-rail 11 and welded therein.

Such bearing blocks are adapted to receive a torsion shaft 15 of approximately the same length as the cross-rail, and to each end of the torsion shaft, and directed toward the rear of the frame, is affixed a wheel bracket 17 which is integrally united to the torsion shaft as by welding. Each such bracket is formed of a pair of spaced arms 19, 21 provided with aligned axle openings 23 at their free ends for the reception of a wheel and axle assembly 25.

Between the torsion shaft and wheel, the bracket arms are reinforced by a web or gusset 27 welded therebetween and to the torsion shaft, such gusset, in addition, providing a mounting for a socket or coil spring retainer 29 facing upwardly.

Extending from each side rail of the frame is a bracket plate 31 terminating in a similar socket or coil spring retainer 33 so located that its axis substantially coincides with the axis of the first retainer. Between the two retainers is disposed a coil spring 35, which is precluded from dislodgment by a snubber rod 37 passing axially through the spring and retainers. Such snubber rod is adjusted as to effective length by means of a nut 39 threadedly secured to one end, whereby to determine the maximum permissible angle between a wheel bracket and the frame during use. Such manner of mounting the individual wheel, places the spring at a location between the wheel and the torsion shaft whereby softer riding qualities will be imparted to the trailer.

The design of the wheel bracket, places the wheel between the bracket arms, thus eliminating the relatively expensive spindle construction which has been conventionally employed in the mounting of such wheels, and at the same time, minimizes those torsional strains and stresses which such prior conventional type of wheel mountings necessarily introduced into the wheel suspension.

In a completed assembly, both brackets 17 and torsion shaft 15 become a unitary assembly, thereby maintaining the wheel brackets at all times in a common plane, so that there can be no side tilting of the trailer frame or body with respect to the plane of the brackets. One of the principal advantages of such construction lies in the fact that the trailer will bank properly on curves and, therefore, such curves may be taken at high speed.

While the wheel brackets 17, torsion shaft 15 and angle iron cross-rail 11 might be assembled element by element to the frame of the trailer, the construction lends itself to the prefabrication of the wheel brackets, torsion shaft and cross-rail as a complete assembly which may later be assembled to the frame merely by welding the cross-rail 11 to the side rails of the frame.

Bearing stops 41 may be added, one to each end of the cross-rail 11 in bearing contact with the ends of the torsion shaft 15, whereby to preclude any possible sideplay of the torsion shaft and undesirable deviations of the wheels from their straight paths of travel.

In the preferred embodiment just described, the wheel bracket was designed to accommodate a single wheel and axle assembly. However, where the trailer is intended for use in conveying heavy loads, the wheel bracket may be designed to accommodate a pair of such wheels. In such case, the bracket will comprise three bracket arms 43, 45, 47, instead of two as previously described, and such bracket arms will terminate at their free ends in aligned openings for the reception of a dual-wheel and axle assembly 49. Strength and rigidity will be imparted to the bracket by the inclusion of gussets 51, 53 between the respective arms forming the bracket and the torsion shaft to which such gussets will be welded as previously described in connection with the single wheel bracket.

It will be apparent from the structure described, that the invention will fulfill all the objects previously recited therefor, and while we have disclosed our invention in its preferred form, the same is subject to modification and alteration without departing from the underlying principles involved, and we accordingly do not desire to be limited in our protection to such details as we have illustrated and described, except as may be necessitated by the appended claims.

We claim:

1. A wheel suspension for trailers or the like comprising a torsion shaft and a pair of substantially planar wheel brackets welded to said torsion shaft and lying in a common plane, one at each end of the shaft and each terminating in three spaced arms provided with aligned openings at one end for the reception of a pair of wheel and axle assemblies.

2. A wheel suspension for trailers or the like having a frame including side rails, comprising an angle iron cross-rail disposed transversely of said frame and extending therebeyond on either side; a plurality of bearing blocks welded into the angle of said cross-rail; a torsion shaft journaled in said bearing blocks; a wheel bracket welded to said torsion shaft adjacent each end thereof and extending radially therefrom, each of said wheel brackets involving three spaced radially disposed arms provided with aligned openings at their free ends for the reception of a pair of wheel and axle assemblies, a web or gusset between said arms and adjacent said torsion shaft, and a coil spring retainer on each of said gussets; a bracket plate extending from each of said side frame side rails and terminating in coil spring retainers in alignment with those of a wheel bracket; a coil spring disposed in and between the retainers of each aligned pair; a snubber rod passing axially through each of said coil springs and retainers to preclude dislodgment of such spring and limit the maximum angular spread of its associated wheel bracket with respect to said frame; and a pair of wheel assemblies supported between the arms of each of said wheel brackets.

3. A wheel suspension for trailers or the like having a frame including side rails, comprising an angle iron cross-rail disposed transversely of said frame and extending therebeyond on either side; a plurality of bearing blocks welded into the angle of said cross-rail; a torsion shaft journaled in said bearing blocks; stop blocks on said cross-rail adjacent each end of said torsion shaft; a wheel bracket welded to said torsion shaft adjacent each end thereof and extending radially therefrom, each of said wheel brackets involving a pair of spaced radially disposed arms provided with aligned openings at their free ends for the reception of a wheel and axle assembly, a web or gusset between said arms and adjacent said torsion shaft, and a coil spring retainer on said gusset; a bracket plate extending from each of said side frame side rails and terminating in a coil spring retainer in alignment with that of a wheel bracket; a coil spring disposed in and between the retainers of each aligned pair; a snubber rod passing axially through each of said coil springs and retainers to preclude dislodgment of such spring and limit the maximum angular spread of its associated wheel bracket with respect to said frame; and a wheel assembly supported between the arms of each of said wheel brackets.

FURLYS F. OPPENLANDER.
JACK L. BOLES.

REFERENCES CITED

The following references are of record in the file of this patent:

UNITED STATES PATENTS

| Number | Name | Date |
|---|---|---|
| 2,164,602 | Valletta | July 4, 1939 |
| 2,262,310 | Wooldridge | Nov. 11, 1941 |
| 2,377,232 | Herold | May 29, 1945 |
| 2,455,787 | Linn | Dec. 7, 1948 |
| 2,465,098 | Inskeep | Mar. 22, 1949 |
| 2,507,980 | Knapp | May 16, 1950 |
| 2,526,866 | Hersey et al. | Oct. 24, 1950 |